July 25, 1967  R. B. EGGEN  3,332,239
PRESSURE BOOSTER APPARATUS FOR HYDRAULIC BRAKE SYSTEMS
Filed Oct. 20, 1965
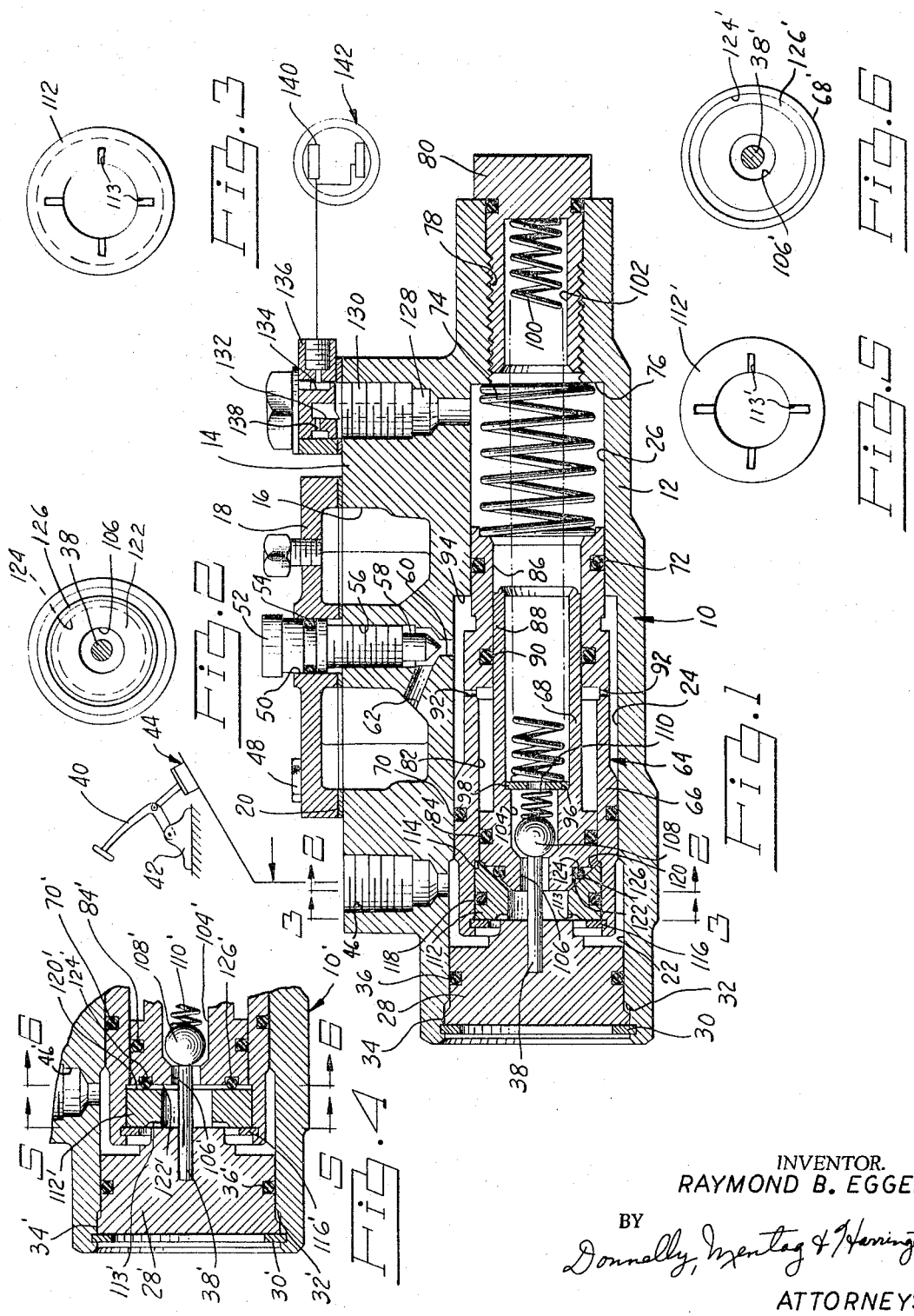
INVENTOR.
RAYMOND B. EGGEN
BY
Donnelly, Mentag & Harrington
ATTORNEYS

United States Patent Office 3,332,239
Patented July 25, 1967

3,332,239
PRESSURE BOOSTER APPARATUS FOR
HYDRAULIC BRAKE SYSTEMS
Raymond B. Eggen, 14252 Montrose,
Detroit, Mich. 48227
Filed Oct. 20, 1965, Ser. No. 498,838
3 Claims. (Cl. 60—54.5)

My invention relates generally to closed hydrostatic circuits and to a fluid pressure modifying structure for use therein. More particularly, my invention relates to improvements in a hydrostatic pressure boosting mechanism for use in a closed hydrostatic system that includes a fluid pressure operated work performing member. A personally operable fluid displacement device is used for selectively pressurizing the work performing member. I contemplate that the improvements in my invention can be applied to a fluid pressure operated brake system for an automotive vehicle in which a hydrostatic fluid master cylinder under the control of the vehicle operator is in closed, fluid communication with wheel brake cylinders. My invention can be used to augment the hydrostatic pressure applied to the wheel brake cylinders for any given degree of brake pedal effort by the vehicle operator.

It is desirable in arrangements of this type to supply fluid in relatively large volume to the wheel brake cylinders during initial operation of the master brake cylinder by the vehicle operator. This will permit the pistons for the wheel brake cylinders to move from their retracted positions to a position at which the associated wheel brakes initially engage the rotary friction surfaces for the wheels. At this instant in the operating cycle large volumetric fluid delivery to the wheel brake cylinders is desired although a high degree of mechanical advantage is not required since the braking requirement during the slack take-up period is at a minimum. During subsequent operating stages, however, it is desirable to increase the mechanical advantage of the brake system in order to reduce to a minimum value the amount of driver effort required to obtain braking action. At this time the volumetric requirements of the wheel brake cylinders are at a minimum.

The provision of an improved, closed, hydrostatic pressure system of the type above set forth being a principal object of my invention, it is another object of my invention to provide a pressure booster apparatus for use in such a system wherein successive stages of pressure augmentation can be obtained as the vehicle operator braking effort increases. In this way, maximum braking action can be obtained after the initial slack take-up period for the wheel brakes is terminated.

It is another object of my invention to provide a pressure booster apparatus of the type above set forth wherein provision is made for transferring directly from the driver controlled, fluid pressure operated, work performing member a relatively large volume of fluid for each incremental unit of brake pedal travel during initial stages of the operating cycle, and to provide a minimum amount of resistance to pedal movement during that initial operating stage. I contemplate, however, that the pressure augmentation required to obtain the necessary braking action following the initial slack take-up period can be obtained without an undue pedal effort.

It is a further object of my invention to provide a vehicle wheel brake pressure booster system which can be mounted at any convenient location without the necessity for making extensive modifications to the vehicle chassis and suspension system.

It is a further object of my invention to provide a pressure booster mechanism of the type above set forth which is comprised of relatively simplified components with a minimum number of critical dimensions.

It is a further object of my invention to provide a pressure booster mechanism for use in a hydrostatic fluid brake system in an automotive vehilce wherein provision is made for eliminating entrapped air in the working fluid of the brake system.

It is a further object of my invention to provide a brake boster mechanism for use with an automotive vehicle chassis which is capable of causing the friction brake to become applied by the vehicle operator with a progressive increase in mechanical assist. A relatively large amount of mechanical assist is obtained during the final stage of the brake application when volumetric delivery requirements of the system are a minimum. This is preceded by operating stages in which there is a relatively reduced amount of brake assist although the pressure delivery requirements at that time are increased. I contemplate that an automatic transition from one operating stage to the other will occur, thereby improving the degree of operator control of the vehicle.

It is a further object of my invention to provide a pressure booster mechanism having relatively movable compound piston portions in a hydrostatic cylinder wherein provision is made for sequentially operating the pistons during separate operating stages.

It is a further object of my invention to provide a pressure booster mechanism of the type set forth in the preceding object wherein provision is made for returning fluid leakage between the relatively movable piston portions to the high pressure region of the system and isolating the leakage from external points that are not part of the closed hydrostatic circuit.

Further objects and features of my invention will become apparent from the following description and from accompanying drawings, wherein:

FIG. 1 shows in a longitudinal cross section form a presure booster valve arrangement for use in a wheel brake system for an automotive vehicle;

FIG. 2 is a transverse cross sectional view taken along the plane of section line 2—2 of FIG. 1;

FIG. 3 is a transverse cross sectional view taken along the plane of section line 3—3 of FIG. 1;

FIG. 4 is a view shown in partial cross section illustrating a modified form of the structure of FIG. 1;

FIG. 5 is a cross sectional view taken along the plane of section line 5—5 of FIG. 4; and, FIG. 6 is a cross sectional view taken along the plane of section line 6—6 of FIG. 4.

In FIG. 1, the numeral 10 designates a booster housing with a generally cylindrical portion 12 and a reservoir portion 14. Both portions are formed as a part of a common casing. The reservoir portion 14 has a hollow interior to form a reservoir chamber 16. Covering the chamber 16 is a cover plate 18 which is secured to the housing portion 14 to define a closed reservoir. A gasket 20 is situated between the cover plate 18 and the top of the housing portion 14.

The housing portion 12 is formed with an opening of generally cylindrical configuration which has sections of different diameters. A first section of the opening is identified by reference character 22. An adjacent section is shown at 24 and the smallest diameter section is shown at 26. An end plug 28 is received within the section 22 of the cylindrical opening. It is held fast by a snap ring 30 and by a shoulder 32 in the housing 12 which engages an annular boss 34. An O-ring 36 is situated in an annular groove formed in the plug 28. A ball valve operating stem 38 is secured within an opening formed in the plug 28 and is positioned so that it extends along the axis of the cylindrical opening.

A driver operated brake pedal is identified by reference character 40. It is pivoted on the vehicle chassis structure as shown at 42 and it is mechanically connected to a piston that is movable in a master brake cylinder 44. This master brake cylinder 44 is in fluid communication with a fitting that is received within a threaded port 46 formed in the housing portion 14. Port 46 communicates with the portion 22 of the opening that defines a booster cylinder.

The reservoir chamber 16 functions as a storage chamber and the cover plate 18 is held fast on the housing portion 14 by screws 48. Disposed within a central opening 50 in the cover plate 18 is a metering element 52 in the form of a threaded screw. The head of the screw is formed with a sealed groove within which is positioned an O-ring seal 54. The screw is threaded in a threaded opening 56 formed in a central boss in the reservoir. The end 58 of the metering element 52 is coned so that it will register with a valve port 60, which in turn communicates with the right hand end of the cylinder section 24. Port 60 communicates with a fluid distributor passage 62 communicating directly with the interior of the reservoir 16.

When the metering element 52 is turned so that the end 58 approaches the valve seat associated with the port 60, fluid communication between the reservoir 16 and the interior of the cylinder section 24 can be interrupted. Fluid communication can be opened progressively, however, by backing off the metering element 52.

Slidably disposed within the cylinder is a compound psiton identified generally by the reference character 64. The piston includes an outer portion 66 and an inner portion 68, the latter being telescopically received within the former.

Outer piston portion 66 registers with the cylinder section 24. A fluid seal 70 located in a sealed groove in the piston portion 66 slidably engages the wall of the cylinder. The right hand end of the outer piston portion 66 is formed with a reduced diameter that slidably registers with the cylinder section 26. A fluid seal 72 carried by the piston portion 66 engages the cylindrical wall of the cylinder portion 26. A compression spring 74 is situated between the right hand end of the piston portion 66 and a spring seat defined by a shoulder 76 in the housing portion 12. The right hand end of the cylinder portion 26 communicates with a threaded opening 78 which receives a threaded closure member 80.

Outer piston portion 66 is formed with a central opening 82 which slidably receives inner piston portion 68. Piston portion 68 includes a seal groove which receives a circular seal ring 84. The reduced diameter portion 86 of the opening 82 in the piston portion 66 slidably receives the reduced diameter portion 88 of the piston portion 68. The piston portion 66 carries a fluid seal 90 which establishes sliding engagement with the inner piston portion 88. The annular space 82 between piston outer and inner portions 66 and 68 communicates through radial ports 92 with the annular space between piston outer portion 66 and the surrounding cylinder portion 24. This annular space in turn communicates with the reservoir port 60. Movement of the piston portion 66 in a right hand direction is limited by a stop in the form of a shoulder 94 which is adapted to engage an annular shoulder formed on the piston portion 66.

The hollow interior of piston portion 68 is formed with a shoulder 96. A plate 98 seated on the shoulder 96 acts as a spring seat for a compression spring 100. The other end of the spring 100 is anchored in an opening 102 formed in the closure member 80. The plate 98 is apertured to permit fluid communication between the interior of the piston outer portion 68 and a valve chamber 104 formed in the left hand end of the piston portion 68. A check valve in the form of a ball valve element 108 is positioned in the valve chamber 104. It controls communication between chamber 104 and a valve port 106. When the compound piston 64 assumes the position shown in FIG. 1, the ball valve stem 38 engages the ball valve element 108 and causes it to become unseated from the valve seat with which it registers. This then causes fluid communication between the left hand end of the cylinder section 22 and the valve chamber 104.

Ball valve element 108 normally is biased towards a port-closing position by a valve spring 110. The left hand end of the opening 82 in the piston outer portion 66 receives a closure ring 112 which is held axially fast by a shoulder 114 formed in the interior of the outer piston portion 66 and by a snap ring 116. A fluid seal 118 surrounds the closure ring 112 and is arranged in sealing engagement with the cylindrical surface of the left hand end of opening 82. The right hand face of the closure ring 112 is formed with a conical valve seat 120. The left hand end of the piston portion 68 is formed with a conical valve face 122 which registers with the conical valve seat 120. A seal groove 124 formed in the conical valve face 122 receives a circular valve seat 126.

The right hand end of the cylinder section 26 is in fluid communication with an outlet port 128 formed in the housing portion 14. Threadably received within the port 128 is a threaded closure element 130. This closure element 130 is formed with a central passage 132 which communicates with an annular groove 134 through orifice 138. This groove 134 in turn communicates with a fluid fitting 136. The fitting 136 establishes a fluid connection with pressure distributor conduits that extend to wheel brake cylinders 140 for wheel brake mechanisms identified schematically in FIG. 1 by reference character 142.

In FIG. 4, I have illustrated a modified construction that is substantially the same as that described with reference to FIG. 1, but the cone face 122 on the outer piston portion 68 has been replaced by a flat valve surface 122'. It engages a flat surface 120' on a valve ring 112'. Each of the elements of the construction of FIG. 4 has been identified by reference characters that are the same as the corresponding reference characters in the construction of FIG. 1, although prime notations have been added.

During operation, the vehicle operator may engage the wheel brakes 142 by applying a pedal force to the brake pedal 40. This causes fluid under pressure to be distributed directly from the port 46 through the open valve chamber 104. At that time the spring 74 urges the compound piston in a left hand direction so that closure ring 112 engages the adjacent boss formed on the closure member 28. The closure ring 112 can be formed with radial grooves 113 to permit free passage of fluid from the port 46 to the valve opening 106. The pressurized fluid then passes directly through the central openings in the piston portions to the outlet port 128. Thus, there is no hydrostatic pressure boost during the initial stages of the brake operation. It is during this period that a relatively high volume of fluid is delivered to the wheel brake cylinders. This occurs with a reduced pressure but the reduced pressure is sufficient to cause the wheel brakes to stroke from their fully released positions to a position corresponding to initial brake engagement. Thus the slack normally associated with brake mechanisms is taken up at this time.

After the slack has been eliminated in the brake mechanism, there is no further need for large volumetric fluid delivery from the master brake cylinder 44 to the wheel brake cylinders 140. There is a need, however, for augmenting the pressure developed by the master brake cylinder 44 so that adequate braking pressure can be developed without an undue brake pedal pressure being required of the vehicle operator. This hydrostatic pressure augmentation occurs in the following fashion.

When the pressure at the output side of the master brake cylinder 44 reaches a predetermined value, the compound piston assembly comprising both the outer piston portion 66 and the inner piston portion 68 is caused to move in a right hand direction. This is due to the pressure differential developed by reason of the differential diameter of the cylinder portions 26 and 24. Movement of the compound piston assembly will cause the ball valve element 108 to move away from the stem 38. This will permit the valve spring 110 to close the ball valve element 108. The magnitude of the pressure made available to the wheel brake cylinder then is equal to the magnitude of the pressure developed by master brake cylinder 44 times the ratio of the diameter of cylinder section 24 to the diameter of cylinder section 26. The spring 74 will yield until the shoulder 94 becomes engaged by the piston portion 66. Continued application of pressure to the brake pedal 40 provides a further increase in the pressure made available by master brake cylinder 44. At a predetermined pressure level, the piston portion 68 will shift relative to the piston portion 68. At that time the magnitude of the pressure made available to the wheel cylinders 140 is equal to the pressure of the master brake cylinder 44 times the ratio of the diameter of opening 82 to the diameter of opening 86. This increases the amount of brake assist.

The strategic disposition of the coned surface 122 of the piston portion 68 with respect to the internal cone surface 120 of the valve closure ring 12, and the strategic disposition of the seal ring 126 assure that the outer piston portion 66 will move in unison with the inner piston portion 68 before the inner piston portion 68 moves with respect to the outer piston portion 66. Thus the pressure booster mechanism will operate in successive stages to provide a progressively increasing power assist. The transition from the first power assist stage to the second power assist stage is determined by the spring force of spring 100 and by the ratio of the diameter of cylinder section 26 to the diameter of the cylinder section 24. This ratio is substantially less than the ratio of the diameter of opening 82 to the diameter of cylinder section 24. The transition point itself is determined also by the diameter of seal ring 126.

In the embodiment of FIG. 4, the compound piston elements operate in substantially the same fashion as the corresponding elements of FIG. 1. The point of transition between one operating stage and the other is determined by the ratio of the diameter of the seal ring 126' to the diameter of the cylinder section 24'. When the power boosting mechanism is operating in the first operating stage, the closure ring seal 126' is effective to prevent fluid pressure distribution to the total fluid pressure working area of the inner piston portion 68'. Just as in the case of the structure of FIG. 1, the structure of FIG. 4 assures that the compound pistons will operate in unison during the first operating stage in advance of the operation of the inner piston portion 68' during the second operating stage.

By appropriately controlling the position of metering valve element 52, the compound piston mechanism can be rendered inoperative by blocking communication between the right hand end of the piston portion 66 and the surge chamber or reservoir chamber 16. This prevents shifting movement of the compound piston assembly in the right hand direction upon application of brake pressure to the brake pedal 40. A power assist is overruled. If a power assist is desired, however, the metering valve element 52 can be backed off to provide a controlled restriction between the right hand end of the compound piston assembly and the surge chamber. The rate at which the transition from one operating stage to the other occurs thus can be controlled.

Any air that might be caused to enter the closed hydrostatic system will ultimately find its way to the port 60 and thence to the passage 62, where it will rise to the surface and be evacuated through a breather opening. The breather opening can be closed by a closure plug as indicated. Thus the closed system is automatically purged of air. The surge chamber 16 can be used to maintain a supply of hydrostatic fluid to compensate for evaporation and leakage. Any sediment or dirt which might accumulate in the reservoir will settle to the bottom at a point below the point of communication of passage 62 with the surge chamber 16.

Having thus described a preferred form of my invention, what I claim and desire to secure by United States Letters Patent is:

1. A hydrostatic pressure amplifier comprising a housing, a stepped diameter cylinder formed in said housing, a fluid pressure inlet port located in a large diameter portion of said cylinder, a fluid pressure outlet port located in a small diameter end of said cylinder, a compound piston assembly situated in said cylinder and having multiple sections of differing diameters for registering respectively with said large diameter cylinder portion and said small diameter cylinder portion, said piston comprising an outer portion having a central opening formed therein with stepped diameter sections, an inner piston portion slidably situated in said piston opening, a fluid seal between said piston portions for isolating a part of the area of said inner piston portion from the fluid pressure that exists in said inlet port when the pressure in said inlet port is of a reduced magnitude, spring means for normally urging said inner piston portion into sealing engagement with said outer piston portion with a predetermined force whereby the effective working pressure area of said inner piston portion over which the pressure of said inlet port is caused to act is changed as the force of said spring means is overcome by the hydrostatic pressure force acting on said compound piston assembly, and second spring means for urging said outer piston portion toward the end of the large diameter portion of said cylinder.

2. A hydrostatic pressure amplifier comprising a housing, a stepped diameter cylinder formed in said housing, a fluid pressure inlet port located in a large diameter portion of said cylinder, a fluid pressure outlet port located in a small diameter end of said cylinder, a compound piston assembly situated in said cylinder and having multiple sections of differing diameters for registering respectively with said large diameter cylinder portion and said small diameter cylinder portion, said piston comprising an outer portion having a central opening formed therein, an inner piston portion slidably situated in said piston opening, a fluid seal between said piston portions for isolating a part of the area of said inner piston portion from the fluid pressure that exists in said inlet port when the pressure in said inlet port is of a reduced magnitude, spring means for normally urging said inner piston portion into sealing engagement with said outer piston portion with a predetermined force whereby the effective working pressure area of said inner piston portion over which the pressure of said inlet port is caused to act is changed as the force of said spring means is overcome by the hydrostatic pressure force acting on said compound piston assembly, a central fluid passage formed in said compound piston for establishing free fluid communication between said ports, valve means situated in and partly defining said fluid passage for interrupting fluid communication therethrough when said compound piston is displaced against the opposing influence of said spring means.

3. A hydrostatic pressure amplifier comprising a housing, a stepped diameter cylinder formed in said housing, a fluid pressure inlet port located in a large diameter portion of said cylinder, a fluid pressure outlet port located in a small diameter end of said cylinder, a compound piston assembly situated in said cylinder and having multiple sections of differing diameters for registering respectively with said large diameter cylinder portion and said small diameter cylinder portion, said piston comprising an outer portion having a central opening formed therein, an inner piston portion slidably situated in said piston opening, a fluid seal between said piston portions for isolating a part of the area of said inner piston portion from the fluid pressure that exists in said inlet port when the pressure in said inlet port is of a reduced magnitude, spring means for normally urging said inner piston portion into sealing engagement with said outer piston portion with a predetermined force whereby the effective working pressure area of said inner portion over which the pressure of said inlet port is caused to act is changed as the force of said spring means is overcome by the hydrostatic pressure force acting on said compound piston assembly, second spring means for urging said outer piston portion toward the end of the large diameter portion of said cylinder, a central fluid passage formed in said compound piston for establishing free fluid communication between said ports, and valve means situated in and partly defining said fluid passage for interrupting fluid communication therethrough when said compound piston is displaced against the opposing influence of said first mentioned spring means.

References Cited

UNITED STATES PATENTS

| | | | |
|---|---|---|---|
| 2,272,360 | 2/1942 | Swift | 60—54.6 |
| 2,381,930 | 8/1945 | Schnell | 60—54.5 |
| 2,737,777 | 3/1956 | Krusemark | 60—54.5 |
| 3,010,282 | 11/1961 | Jansson | 60—54.5 |
| 3,010,283 | 11/1961 | Jansson | 60—54.5 |

MARTIN P. SCHWADRON, *Primary Examiner.*

ROBERT R. BUNEVICH, *Examiner.*